(12) United States Patent
Jeong et al.

(10) Patent No.: US 11,164,702 B2
(45) Date of Patent: Nov. 2, 2021

(54) MULTI-LAYERED CERAMIC ELECTRONIC COMPONENT HAVING STEP ABSORPTION LAYER

(71) Applicant: SAMSUNG ELECTRO-MECHANICS CO., LTD., Suwon-si (KR)

(72) Inventors: Gi Seok Jeong, Suwon-si (KR); Ho In Jun, Suwon-si (KR); Sun Cheol Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/548,151

(22) Filed: Aug. 22, 2019

(65) Prior Publication Data
US 2020/0118759 A1  Apr. 16, 2020

(30) Foreign Application Priority Data
Oct. 10, 2018 (KR) .......................... 10-2018-0120323

(51) Int. Cl.
*H01G 4/30* (2006.01)
*H01G 4/12* (2006.01)
(Continued)

(52) U.S. Cl.
CPC .............. *H01G 4/30* (2013.01); *H01G 4/012* (2013.01); *H01G 4/12* (2013.01); *H01G 4/232* (2013.01)

(58) Field of Classification Search
CPC ............ H01G 4/30; H01G 4/012; H01G 4/12; H01G 4/232
See application file for complete search history.

(56) References Cited

U.S. PATENT DOCUMENTS 6,091,598 A 7/2000 Kobayashi
6,385,034 B2 * 5/2002 Tanaka ..................... H01C 1/14
361/306.3
(Continued)

FOREIGN PATENT DOCUMENTS

JP H10-275736 A 10/1998
JP 2000-311831 A 11/2000
(Continued)

OTHER PUBLICATIONS

Office Action issued in Korean Patent Application No. 10-2018-0120323 dated Nov. 28, 2019, with English translation.
(Continued)

*Primary Examiner* — David M Sinclair
(74) *Attorney, Agent, or Firm* — Morgan, Lewis & Bockius LLP

(57) ABSTRACT

A multi-layered ceramic electronic component includes: a ceramic body including a dielectric layer and first and second internal electrodes disposed to oppose each other with the dielectric layer interposed therebetween; and first and second external electrodes disposed outside of the ceramic body and electrically connected to the first and second internal electrodes, respectively. The first internal electrode is exposed from a first surface of the ceramic body and the second internal electrode is exposed from a second surface opposing the first surface. The first internal electrode has a notch portion disposed inwardly of a portion facing the first surface and, and the second internal electrode has a notch portion disposed inwardly of a portion facing the second surface. Each of the notch portions and a margin portion of the ceramic body in a second direction and in a third direction are provided with a step absorption layer, respectively.

18 Claims, 7 Drawing Sheets

(51) Int. Cl.
  *H01G 4/012* (2006.01)
  *H01G 4/232* (2006.01)

(56) References Cited

U.S. PATENT DOCUMENTS

| | | | |
|---|---|---|---|
| 6,475,317 B1 | 11/2002 | Baba et al. | |
| 2001/0006451 A1* | 7/2001 | Miyazaki | B32B 18/00 361/321.2 |
| 2003/0230374 A1* | 12/2003 | Yamana | H01C 7/18 156/89.12 |
| 2008/0080121 A1* | 4/2008 | Togashi | H01G 4/30 361/303 |
| 2008/0144253 A1* | 6/2008 | Togashi | H01G 4/30 361/301.4 |
| 2011/0007449 A1 | 1/2011 | Seo et al. | |
| 2013/0200749 A1* | 8/2013 | Nishisaka | H01C 1/148 310/311 |
| 2014/0347783 A1* | 11/2014 | Kisumi | H01G 4/012 361/301.4 |
| 2015/0070818 A1 | 3/2015 | Tsuru et al. | |

FOREIGN PATENT DOCUMENTS

| | | | |
|---|---|---|---|
| JP | 2000-340455 | A | 12/2000 |
| JP | 2001-297944 | A | 10/2001 |
| JP | 2003-234242 | A | 8/2003 |
| JP | 2003234242 | A * | 8/2003 |
| JP | 2006100754 | A * | 4/2006 |
| JP | 2011-18874 | A | 1/2011 |
| JP | 2014127581 | A * | 7/2014 |
| JP | 2014-220324 | A | 11/2014 |
| KR | 20070103153 | A * | 10/2007 |
| KR | 10-2015-0005975 | A | 1/2015 |

OTHER PUBLICATIONS

Notice of Decision for Dismissal of Amendment issued in corresponding Korean Patent Application No. 10-2018-0120323 dated Jul. 7, 2020, with English translation.

Notice of Decision for Rejection issued in corresponding Korean Patent Application No. 10-2018-0120323 dated Jul. 7, 2020, with English translation.

* cited by examiner

II-II'

MULTI-LAYERED CERAMIC ELECTRONIC COMPONENT HAVING STEP ABSORPTION LAYER

CROSS-REFERENCE TO RELATED APPLICATION(S)

This application claims benefit of priority to Korean Patent Application No. 10-2018-0120323 filed on Oct. 10, 2018 in the Korean Intellectual Property Office, the disclosure of which is incorporated herein by reference in its entirety.

TECHNICAL FIELD

The present disclosure relates to a multi-layered ceramic electronic component, and more particularly, to a multi-layered ceramic electronic component having excellent reliability.

BACKGROUND

In recent years, as miniaturization, slimming, and multi-functionalization of electronic products, multi-layered ceramic capacitors have been required to be miniaturized, and mounting of the multi-layered ceramic capacitors is also highly integrated.

A multi-layered ceramic capacitor, an electronic component, may be mounted on the printed circuit boards various types of electronic products, including image display devices, such as a liquid crystal display (LCD) and a plasma display panel (PDP), a computer, a personal digital assistant (PDA), a mobile phone, and the like, serving to charge or discharge electricity.

The multi-layered ceramic capacitor may be used as a component of various electronic devices due to advantages thereof, such as miniaturization, high capacitance, and ease of mounting.

Meanwhile, in recent years, as industry interest in electronic products has increased, multi-layered ceramic capacitors have been required to have high capacitance and high reliability characteristics to be used in automobiles and infotainment systems.

As described above, in order to realize the multi-layered ceramic capacitor satisfying the high capacitance and high reliability characteristics, a structure for increasing the number of laminated layers of the dielectric layer and the internal electrode layer is required in proportion thereto.

However, as compared with the increase in the number of laminated layers of the dielectric layer and the internal electrode layer, a problem of interlayer interface defects between the dielectric layer and the internal electrode layer due to insufficient interlayer adhesion in the active portion occurs.

SUMMARY

The present disclosure relates to a multi-layered ceramic electronic component, and more particularly, to a multi-layered ceramic electronic component having excellent reliability.

According to an aspect of the present disclosure, a multi-layered ceramic electronic component includes: a ceramic body including a dielectric layer and first and second internal electrodes disposed to oppose each other with the dielectric layer interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and first and second external electrodes disposed outside of the ceramic body to be electrically connected to the first and second internal electrodes, respectively. The first internal electrode is exposed from the first surface of the ceramic body and the second internal electrode is exposed from the second surface. The first internal electrode has a notch portion disposed inwardly of a portion exposed facing the first surface, and the second internal electrode has a notch portion disposed inwardly of a portion facing the second surface. Each of the notch portions and a margin portion of the ceramic body in the second direction and the third direction are provided with a step absorption layer, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
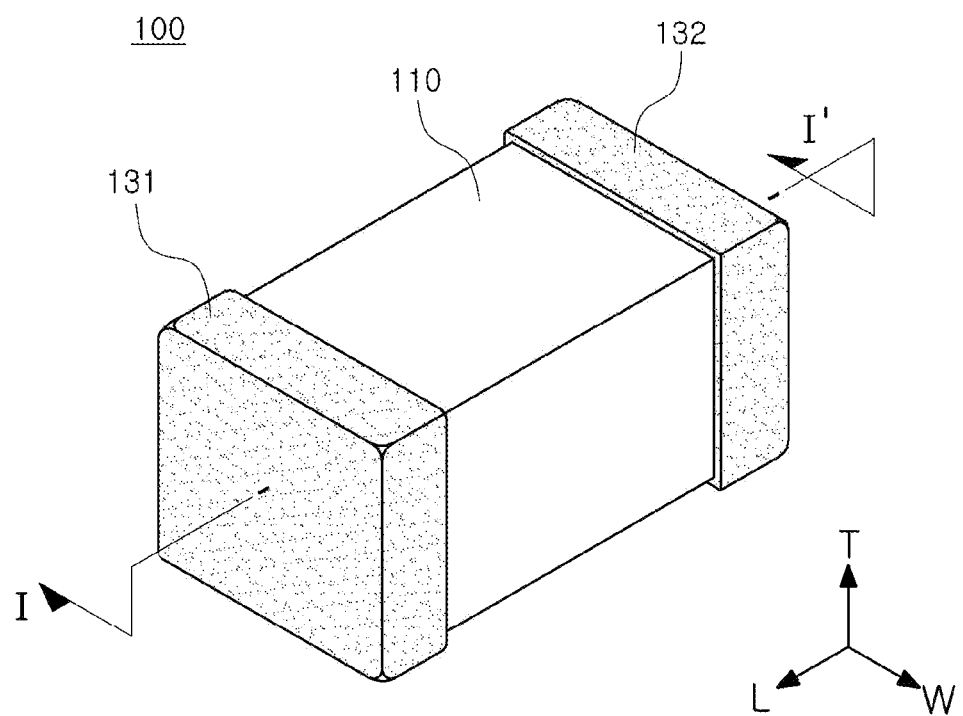
FIG. 1 is a perspective view illustrating a multi-layered ceramic capacitor according to an embodiment of the present disclosure.

Hereinafter, exemplary embodiments of the present disclosure will now be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

Throughout the specification, when a component is referred to as "comprise" or "comprising," it means that it may include other components as well, rather than excluding other components, unless specifically stated otherwise.

In order to clearly illustrate the present disclosure in the drawings, portions not related to the description are omitted, and thicknesses are enlarged in order to clearly illustrate various layers and regions, and similar reference numerals are used for similar portions throughout the specification.

Hereinafter, exemplary embodiments in the present disclosure will be described in detail with reference to the accompanying drawings.

FIG. 1 is a perspective view illustrating a multi-layered ceramic capacitor according to an embodiment of the present disclosure.

Figure 2:
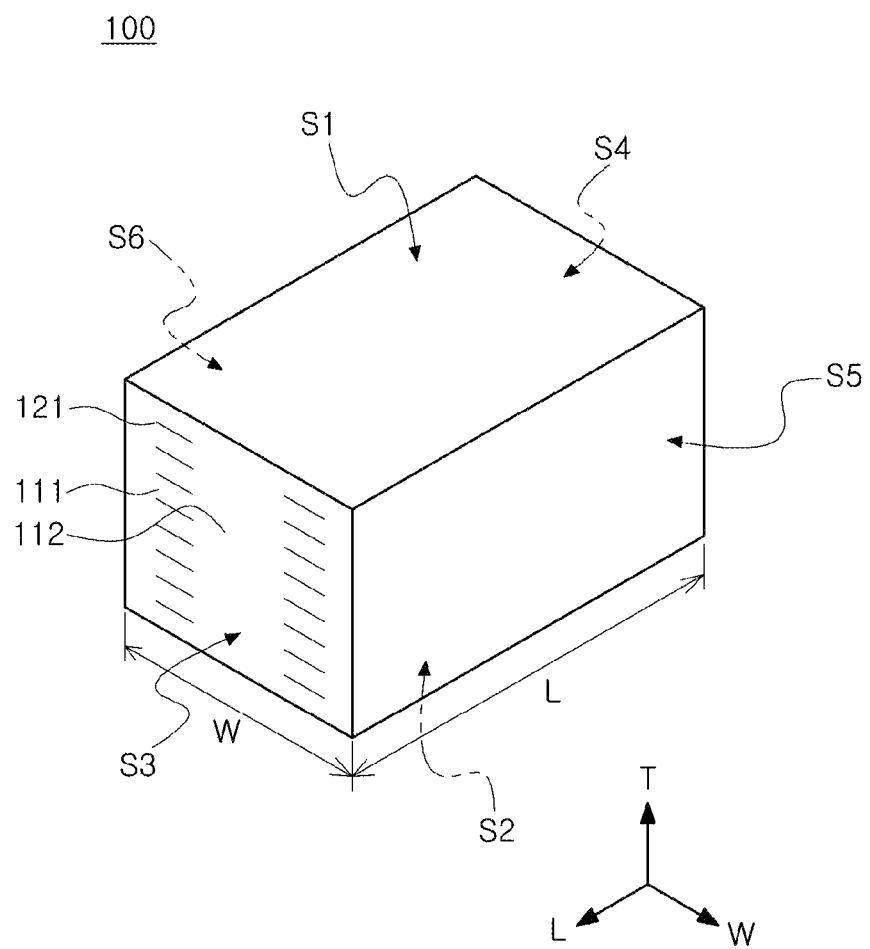
FIG. 2 is a schematic view illustrating a ceramic body according to an embodiment of the present disclosure.

FIG. 2 is a schematic view illustrating a ceramic body according to an embodiment of the present disclosure.

Figure 3:
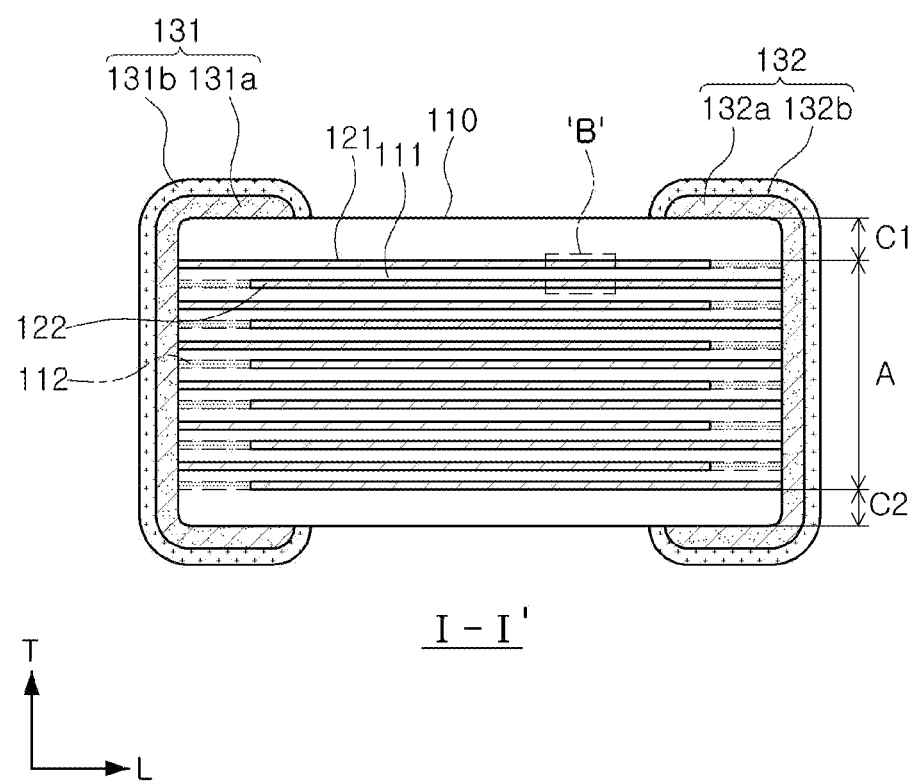
FIG. 3 is a cross-sectional view taken along line I-I' of FIG. 1.

FIG. 3 is a cross-sectional view taken along line I-I' of FIG. 1.

Referring to FIGS. 1 to 3, a multi-layered ceramic electronic component 100 according to an embodiment of the present disclosure may include a ceramic body 110 including a dielectric layer 111 and a plurality of first and second internal electrodes 121 and 122 disposed to oppose each other with the dielectric layer 111 interposed therebetween, and having a first surface S1 and a second surface S2 opposing each other in a first direction, a third surface S3 and a fourth surface S4 connected to the first surface S1 and the second surface S2, and opposing each other in a second direction, and a fifth surface S5 and a sixth surface S6 connected to the first to fourth surfaces S1 to S4, and opposing each other in a third direction, and first and second external electrodes 131 and 132 disposed outside of the ceramic body 110 and electrically connected to the plurality of first and second internal electrodes 121 and 122, respectively. The ceramic body 110 may include an active portion A in which capacitance is formed by including the plurality of first and second internal electrodes 121 and 122 disposed to oppose each other with the dielectric layer 111 interposed therebetween, and cover portions C1 and C2 formed on an upper portion and a lower portion of the active portion A, respectively.

Hereinafter, a multi-layered ceramic electronic component according to an embodiment of the present disclosure will be described, but, in particular, a multi-layered ceramic capacitor will be described, but the present disclosure is not limited thereto.

In the multi-layer ceramic capacitor according to an embodiment of the present disclosure, a 'longitudinal direction' may be defined as an 'L' direction, a 'width direction' may be defined as a 'W' direction, and a 'thickness direction' may be defined as 'T' direction. Here, the 'thickness direction' may be used in the same concept as a direction in which the dielectric layers are laminated, that is, 'a lamination direction'.

In an embodiment of the present disclosure, the ceramic body 110 is not particularly limited in shape, but may have a hexahedron shape as shown.

The ceramic body 110 may have a first surface S1 and a second surface S2 opposing each other in a first direction, a third surface S3 and a fourth surface S4 connected to the first surface S1 and the second surface S2, and opposing each other in a second direction, and a fifth surface S5 and a sixth surface S6 connected to the first to fourth surfaces S1 to S4 and opposing each other in a third direction.

The first surface S1 and the second surface S2 may be defined as surfaces facing each other in the thickness direction of the ceramic body 110, in the first direction, the third surface S3 and the fourth surface S4 may be defined as surfaces facing each other in the longitudinal direction, in the second direction, and the fifth surface S5 and the sixth surface S6 may be defined as surfaces facing each other in the width direction, in the third direction.

According to an embodiment of the present disclosure, a raw material for forming the dielectric layer 111 is not particularly limited as long as sufficient electrostatic capacitance may be obtained therewith. For example, a barium titanate-based material, a lead composite perovskite-based material, a strontium titanate-based material, or the like, may be used.

As materials for forming the dielectric layer 111, a variety of ceramic additives, organic solvents, plasticizers, binders, dispersants, and the like, may be added to the powder, barium titanate (BaTiO3), and the like, according to purposes of the present disclosure.

The ceramic body 110 may include an active portion A serving as a portion contributing to capacitor formation of the capacitor and an upper cover portion C1 and a lower cover portion C2, respectively formed in the upper and lower portions of the active portion A as upper and lower margin portions.

The active portion A may be formed by repeatedly laminating a plurality of first and second internal electrodes 121 and 122 with a dielectric layer 111 interposed therebetween.

The upper cover portion C1 and the lower cover portion C2 may have the same material and configuration as the dielectric layer 111 except that the they do not have internal electrodes.

That is, the upper cover portion C1 and the lower cover portion C2 may include a ceramic material, for example, a barium titanate (BaTiO$_3$)-based ceramic material.

The upper cover portion C1 and the lower cover portion C2 may be formed by laminating a single dielectric layer or two or more dielectric layers on the upper and lower surfaces of the active portion A in a vertical direction, respectively, and the upper cover portion C1 and the lower cover portion C2 may basically prevent damage to the internal electrodes due to physical or chemical stress.

The first internal electrode 121 may be exposed to one surface of the ceramic body 110, and the second internal electrode 122 may be exposed to the other surface opposing the one surface of the ceramic body 110.

Specifically, one ends of a plurality of the first and second internal electrodes 121 and 122 of the active portion A may be exposed to the third surface S3 or the fourth surface S4.

The internal electrodes 121 and 122 may have a pair of a first internal electrode 121 and a second internal electrode 122 having different polarities.

One end of the first internal electrode 121 may be exposed to the third surface S3, and one end of the second internal electrode 122 may be exposed to the fourth surface S4.

The other end of the first internal electrode 121 may be formed at a predetermined distance from the fourth surface S4, and the other end of the second internal electrode 122 may be formed at a predetermined distance from the third surface S3. More specific details will be described later.

First and second external electrodes 131 and 132 may be formed on the third surface S3 and the fourth surface S4 of the ceramic body 110 to be electrically connected to the internal electrodes 121 and 122, respectively.

Figure 4A:
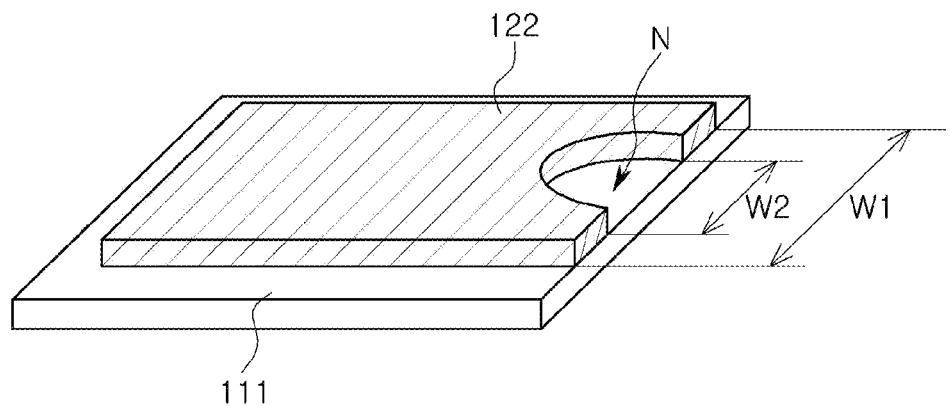
FIG. 4A is a perspective view illustrating a pattern shape of a second internal electrode disposed on a dielectric layer in a multi-layered ceramic capacitor according to an embodiment of the present disclosure.

FIG. 4A is a perspective view illustrating a pattern shape of a second internal electrode disposed on a dielectric later in a multilayer ceramic capacitor according to an embodiment of the present disclosure.

Referring to FIG. 4A, the second internal electrode 122 may be provided with a notch portion N disposed inwardly of a portion exposed to one surface of the ceramic body 110.

Since one end of the second internal electrode 122 is exposed to the fourth surface S4, the notch portion N may be disposed inwardly of portions of the second internal electrode 122 exposed to the fourth surface S4 of the ceramic body 110. Similarly, although not shown in FIG. 4A, the first internal electrode 121 may be provided with a notch portion N disposed inwardly of a portion exposed to the other surface of the ceramic body 110. Since one end of the first internal electrode 121 is exposed to the third surface S3, the notch portion N of the first internal electrode 121 may be disposed inwardly of portions of the first internal electrode 121 exposed to the third surface S3 of the ceramic body 110.

Recently, as industry interest in electronic products has increase, multi-layered ceramic capacitors have been required to have high capacitance and high reliability characteristics to be used in automobiles or infotainment systems.

As described above, in order to realize a multi-layered ceramic capacitor satisfying high capacitance and high reliability characteristics, a structure for increasing the number of laminated layers of the dielectric layer and the internal electrode layer is required in proportion thereto.

However, as compared with the increase in the number of laminated layers of the dielectric layer and the internal electrode layer, a problem of interlayer interface defects between the dielectric layer and the internal electrode layer due to insufficient interlayer adhesion in the active portion may occur.

According to an embodiment of the present disclosure, the notch portion N may be disposed inwardly of portions of the first and second internal electrodes 121 and 122 exposed to the third surface S3 and the fourth surface S4 of the ceramic body 110, such that an exposed area of the internal electrodes may be significantly reduced and the occurrence of interface defects may be prevented.

Specifically, it is possible to significantly reduce the exposed area of the internal electrodes, increase a bonding ratio of the same kind of dielectric as described later, such that delamination and cracking failures may be prevented and interface bonding force may be increased.

According to an embodiment of the present disclosure, a width W2 of the notch portion N may be 20% to 80% compared to the width W1 of the first internal electrode 121 and the second internal electrode 122.

The width W2 of the notch portion N may be adjusted to satisfy 20% to 80% compared to the width W1 of the first internal electrode 121 and the second internal electrode 122, such that delamination and cracking failures may be prevented even when the number of laminated layers of the dielectric layer and the internal electrode is increased by significantly reducing the exposed area of the internal electrode.

When the width W2 of the notch portion N is less than 20% of the width W1 of the first internal electrode 121 and the second internal electrode 122, since the width W2 of the notch portion N is small and the area of the exposed internal electrode is increased, delamination and cracking failures may be a problem.

On the other hand, when the width W2 of the notch portion N exceeds 80% compared to the width W1 of the first internal electrode 121 and the second internal electrode 122, the area of the exposed internal electrode may be excessively small, such that a problem such as an electrical connection with external electrodes and a problem such as deterioration of electrostatic capacitance due thereto may occur.

Figure 4B:
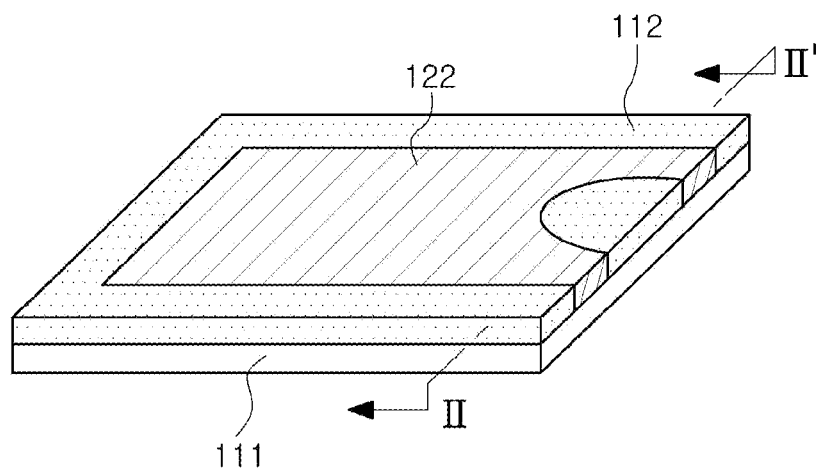
FIG. 4B is a perspective view illustrating a shape in which a step absorption layer is disposed in a second internal electrode non-formation region in FIG. 4A.

FIG. 4B is a perspective view illustrating a shape in which a step absorption layer is disposed in a second internal electrode non-formed region in FIG. 4A.

Referring to FIG. 4B, a step absorption layer 112 may be disposed in the notch portion N and in a margin portion of the ceramic body 110 in the second direction and third direction.

The margin portion of the ceramic body 110 in the second direction may be a margin portion of the ceramic body 110 in a longitudinal direction, and the margin portion of the ceramic body 110 in the third direction may be may be a margin portion of the ceramic body 110 in a width direction.

The margin portion of the ceramic body 110 in the second direction and the third direction may be the margin portion of the active portion A.

That is, in an embodiment of the present disclosure, the region in which the step absorption layer 112 is disposed may be a margin portion of the ceramic body 110 in the second direction, a longitudinal direction, and a margin portion of the ceramic body 110 in the third direction, a width direction, and the notch portion N region.

In addition, the region in which the step absorption layer 112 is disposed is the margin portion of the ceramic body 110 in the second direction and the third direction in the active portion A, and thus, may not be disposed in the cover portions C1 and C2.

However, the present disclosure is not limited thereto, and the step absorption layer 112 may be disposed in the margin portion of the ceramic body 110 in the second direction and the third direction in the cover portions C1 and C2.

As described above, according to an embodiment of the present disclosure, since the step absorption layer 112 is disposed in the notch portion N and the margin portion of the ceramic body 110 in the second direction and the third direction, a bonding ratio of the same kind of dielectric may be increased, and the interface bonding force may be improved.

A method of disposing the step absorption layer 112 in the margin portion of the active portion A in the longitudinal direction and in the width direction is not particularly limited, and the method may be performed by applying a conductive metal paste to a ceramic green sheet in a manufacturing process step and then by applying a ceramic material for step absorption in a margin portion, a region in which the conductive metal paste is not applied in a longitudinal direction and a width direction.

Alternately, it may be performed by inserting at least one or more separate dielectric layers in which the step absorption layer 112 is disposed in the margin portion of the active portion A in the longitudinal direction and in the width direction. In this case, a plurality of first ceramic green sheets coated with a conductive metal paste to be the first and second internal electrodes 121 and 122 after sintering are laminated, and a ceramic member is formed in both end portions thereof, and a second ceramic green sheet on which the step absorption layer is formed is laminated.

As the number of ceramic green sheets to be laminated recently increases, there is a problem that reliability of the product is affected by a laminated process and a pressing process of the ceramic green sheet.

That is, the ceramic green sheet is composed of an internal electrode forming portion and a margin portion, an internal electrode non-formation portion. When a predetermined pressure is applied after the ceramic green sheet is laminated and pressed together, a problem in which a step between the internal electrode forming portion and the margin portion, the internal electrode non-formation portion, is worsened, and a withstand voltage characteristic is deteriorated may occur, and a problem in which of delamination and cracking occurrence due to a limit of a bonding force between the dielectric layer and the internal electrode, which are different material, may occur.

However, according to an embodiment of the present disclosure, a step absorption layer 112 may be disposed in the margin portion of the active portion A in the longitudinal direction and the width direction and the notch portion N, thereby realizing high capacitance multilayer ceramic electronic component in which a problem of step is solved and the withstand voltage characteristic is improved.

In addition, it is possible to improve interface bonding force by increasing the same kind of dielectric bonding ratio.

A thickness of the step absorption layer 112 is not particularly limited, and may be, for example, greater than 10 to 20 times a thickness of the dielectric layer 111.

In addition, the thickness of the step absorption layer 112 may be equal to the thicknesses of the first and second internal electrodes 121 and 122 formed on the dielectric layer 111, but is not limited thereto, and may have a difference in the internal electrode due to the process characteristics.

Meanwhile, the step absorption layer 112 may be formed of the same or the same kind of material as a material of the dielectric layer 111, and is not particularly limited. A boundary between the step absorption layer 112 and the dielectric layer 111 may exist. The step absorption layer 112 and the dielectric layer 111 may have the same, or different, material compositions.

Figure 5:
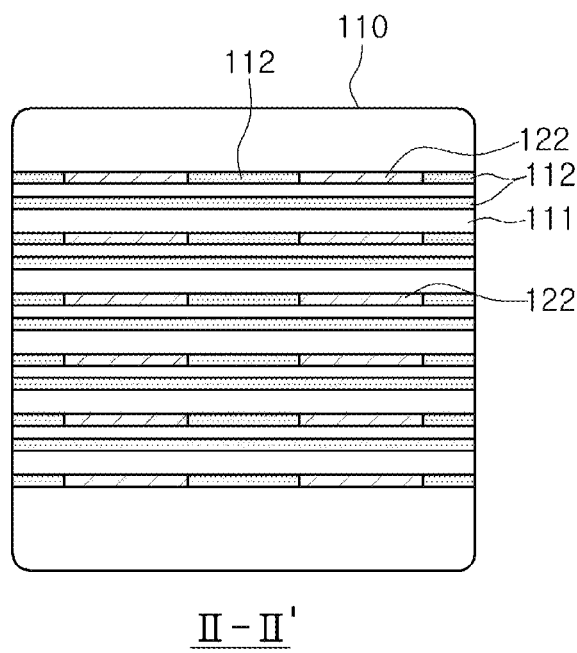
FIG. 5 is a cross-sectional view of the ceramic body taken along line II-II' of FIG. 4B.

FIG. 5 is a cross-sectional view of the ceramic body taken along line II-II' of FIG. 4B. For convenience, the number of layers shown in FIG. 5 is more than that shown in FIG. 4.

Referring to FIG. 5, it can be seen that the step absorption layer 112 is disposed in the margin portion of the active portion A in the width direction and in the notch portion N.

As a result, it is possible to improve the interfacial bonding force by increasing the same kind of dielectric bonding ratio, thereby improving the reliability of the multi-layered ceramic capacitor.

Figure 6:
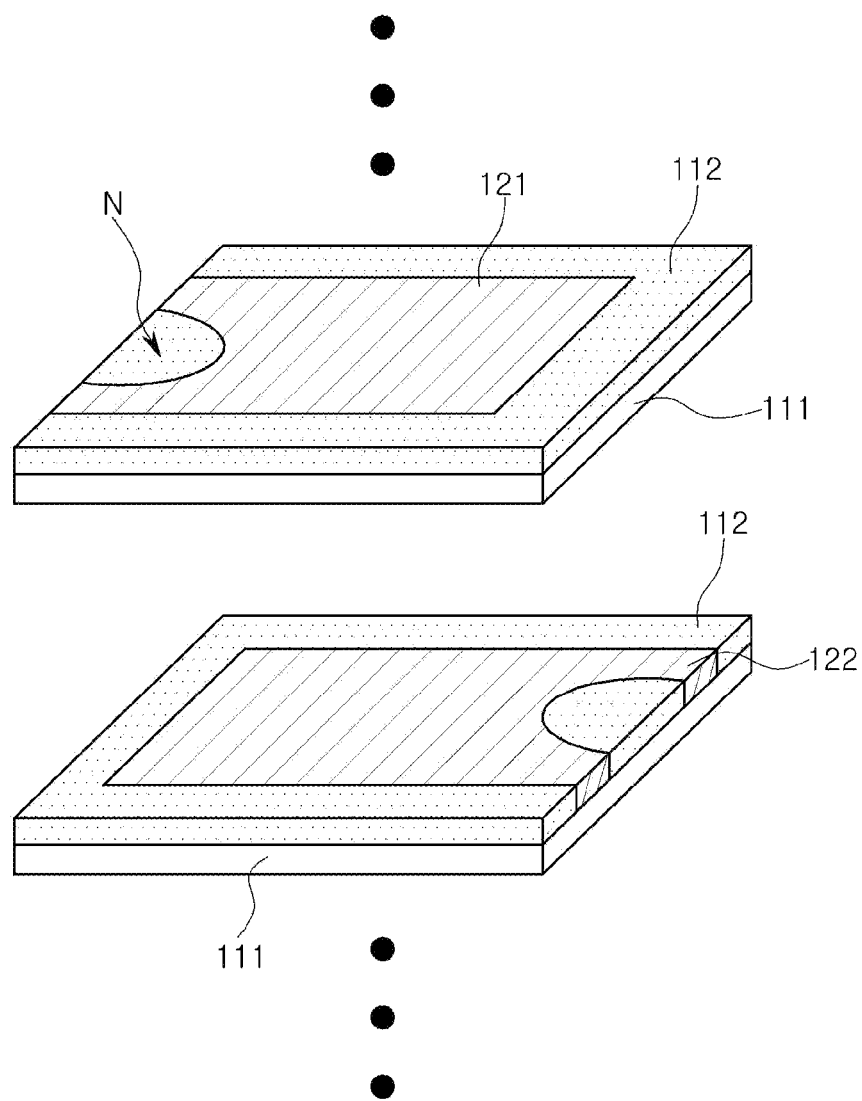
FIG. 6 is a schematic exploded perspective view illustrating a portion of the multi-layered ceramic electronic component shown in FIG. 1.

FIG. 6 is a schematic exploded perspective view illustrating a portion of the multi-layered ceramic electronic component illustrated in FIG. 1.

Referring to FIG. 6, a first internal electrode 121 may be disposed on one dielectric layer 111, the first internal electrode 121 may be provide with a notch portion N disposed inwardly of a portion exposed to the third surface S3 of the ceramic body 110, and a step absorption layer 112 may be disposed in the margin portion in which the first internal electrode 121 is not disposed on one electric layer 111 in the longitudinal direction and in the width direction and the notch portion N.

In addition, a second internal electrode 122 may be disposed on the other dielectric layer 111, the second internal electrode 122 may be provided with a notch portion N disposed inwardly of a portion exposed to the fourth surface S4 of the ceramic body 110, and a step absorption layer 112 may be disposed in the margin portion in which the second internal electrode 122 is not disposed on one dielectric layer 111 in the longitudinal direction and in the width direction and the notch portion N.

One dielectric layer 111 on which the first internal electrode 121 and a step absorption layer 112 are disposed and the other dielectric layer 111 on which the second internal electrode 122 and a step absorption layer 112 are disposed may be alternately laminated, thereby forming the ceramic body 110 according to an embodiment of the present disclosure.

A material forming the first and second internal electrodes 121 and 122 is not limited to any particular material. For example, a material of the first and second internal electrodes 121 and 122 may be formed using a conductive paste including one or more elements among silver (Ag), lead (Pb), platinum (Pt), nickel (Ni), and copper (Cu).

The multi-layered ceramic capacitor according to an embodiment of the present disclosure may include a first external electrode 131 electrically connected to the first internal electrode 121 and a second external electrode 132 electrically connected to the second internal electrode 122.

The first and second external electrodes 131 and 132 may be electrically connected to the first and second internal electrodes 121 and 122 to form capacitance, and the second external electrode 132 may be connected to a potential different from a potential of the first external electrode 131.

The first and second external electrodes 131 and 132 may be disposed on the third surface S3 and the fourth surface S4 of the ceramic body 110 in the longitudinal direction, the second direction, respectively, and may extend to and be disposed on the first surface S1 and the second surface S2 of the ceramic body in the thickness direction, the first direction.

The external electrodes 131 and 132 may be disposed outside of the ceramic body 110, and may include electrode layers 131a and 132a electrically connected to the internal electrodes 121 and 122 and conductive resin layers 131b and 132b disposed on the electrode layers 131a and 132a, respectively.

The electrode layers 131a and 132a may include a conductive metal and a glass.

The conductive metal used in the electrode layers 131a and 132a is not particularly limited as long as it is a material that can be electrically connected to the internal electrodes for forming capacitance, for example, may be one or more selected from a group consisting of copper (Cu), silver (Ag), nickel (Ni), and alloys thereof.

The electrode layers 131a and 132a may be formed by applying a conductive paste prepared by adding glass frit to the conductive metal powder and then firing the paste.

The conductive resin layers 131b and 132b may be formed on the electrode layers 131a and 132a, and may be formed to completely cover the electrode layers 131a and 132a.

A base resin contained in the conductive resin layers 131b and 132b is not particularly limited as long as it has bondability and impact absorbing ability and may be mixed with the conductive metal powder to form a paste, for example, the base resin may include, for example, an epoxy resin.

The conductive metal contained in the conductive resin layers 131b and 132b is not particularly limited as long as it is a material that can be electrically connected to the electrode layers 131a and 132a, for example, may include one or more selected from a group consisting of copper (Cu), silver (Ag), nickel (Ni), and alloys thereof.

Figure 7:
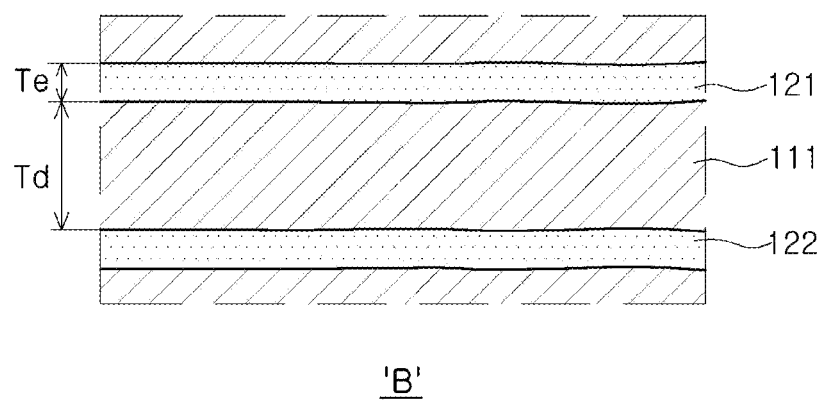
FIG. 7 is an enlarged view of region B in FIG. 3.

FIG. 7 is an enlarged view of region B of FIG. 3.

Referring to FIG. 7, in the multi-layered ceramic electronic component according to an embodiment of the present disclosure, the thickness td of the dielectric layer 111 and the thickness to of the internal electrodes 121 and 122 may satisfy td>2×te.

That is, in an embodiment of the present disclosure, the thickness td of the dielectric layer 111 may be greater than twice the thickness te of the internal electrodes 121 and 122.

In general, high voltage electric field electronic components may have a reliability problem due to a decrease in a breakdown voltage under a high voltage environment.

A multi-layered ceramic capacitor according to an embodiment of the present disclosure may be formed by making the thickness td of the dielectric layer 111 greater than twice the thickness te of the internal electrodes 121 and 122 in order to prevent the breakdown voltage from being lowered under the high voltage environment. The breakdown voltage characteristic may be improved by increasing the thickness of the dielectric layer, a distance between the internal electrodes.

When the thickness td of the dielectric layer 111 is twice or less than the thickness te of the internal electrodes 121 and 122, the breakdown voltage may be lowered, since the thickness of the dielectric layer, a distance between the internal electrodes, is reduced.

The thickness te of the internal electrode may be less than 1 μm, and the thickness td of the dielectric layer may be less than 2.8 μm, but the present disclosure is not limited thereto.

Hereinafter, a method for manufacturing a multi-layered ceramic electronic component according to an embodiment of the present disclosure will be described, but the present disclosure is not limited thereto.

The method for manufacturing a multi-layered ceramic electronic component according to an embodiment of the present disclosure is as follows. A slurry formed including a powder such as barium titanate ($BaTiO_3$), or the like, may be applied to a carrier film and then dried to prepare a plurality of ceramic green sheets, thereby forming a dielectric layer.

The slurry is a slurry for a ceramic green sheet for forming a dielectric layer of the active portion of the active portion and a dielectric layer constituting the cover portion.

The ceramic green sheet may be formed in a form of sheet having a thickness of several μms using slurry made from mixture of ceramic powder, binder, and solvent, and by performing a doctor blade method to coat the slurry.

Next, a conductive metal paste may be applied on the ceramic green sheet to form an internal electrode pattern.

The internal electrode pattern may be formed by a screen printing method or a gravure printing method.

According to an embodiment of the present disclosure, a notch portion may be formed inside of one end portion of the internal electrode pattern.

The notch portion may be formed inside of a portion of the end portion of the internal electrode pattern exposed to the outside, whereby an area of the internal electrode exposed in an embodiment of the present disclosure may be significantly reduced.

Next, a ceramic member may be formed in the margin portion of the ceramic green sheet in the longitudinal direction and in the width direction and the notch portion to form a step absorption portion.

A method for forming the ceramic member in the margin portion of the ceramic green sheet in the longitudinal direction and in the width direction and the notch portion is not particularly limited, and may be performed by, for example, a printing method.

Next, a green sheet having an internal electrode pattern and a step absorption layer disposed thereon was laminated to from a ceramic body 110.

Next, an electrode layer including one or more conductive metal and glass selected from a group consisting of copper (Cu), silver (Ag), nickel (Ni), and alloys thereof may be formed outside the ceramic body.

The glass is not particularly limited, and a material having the same composition as glass used for an external electrode of a general multi-layered ceramic capacitor may be used.

The electrode layer may be formed on the upper and lower surfaces and the end portion of the ceramic body to be electrically connected to the first and second internal electrodes, respectively.

The electrode layer may include 5% by volume or more of glass compared to the conductive metal.

Next, a conductive resin composition may be applied to the electrode layers 131a and 132a and then cured to form conductive resin layers 131b and 132b.

The conductive resin layers 131b and 132b may include one or more conductive metal and a base resin selected from a group consisting of copper (Cu), silver (Ag), nickel (Ni), and alloys thereof, and the base resin may be an epoxy resin.

In addition, a plating layer (not shown) may be further formed in upper portions of the conductive resin layers 131b and 132b, and a nickel (Ni) plating layer and a tin (Sn) plating layer may be sequentially formed and the plating layers may be formed on the conductive resin layers.

As set forth above, according to an embodiment of the present disclosure, it is possible to significantly reduce an exposed area of an internal electrode and simultaneously increase the same kind of dielectric bonding ratio, thereby improving delamination and cracking failure and increasing the interface bonding force.

While exemplary embodiments have been shown and described above, it will be apparent to those skilled in the art that modifications and variations could be made without departing from the scope of the present invention as defined by the appended claims.

What is claimed is:

1. A multi-layered ceramic electronic component, comprising:
    a ceramic body including a dielectric layer and first and second internal electrodes stacked in a first direction with the dielectric layer interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and
    first and second external electrodes disposed outside of the ceramic body and including first and second electrode layers, respectively, the first and second electrode layers connected to the first and second internal electrodes, respectively,
    wherein the first internal electrode is exposed from the third surface of the ceramic body and the second internal electrode is exposed from the fourth surface,
    wherein the first internal electrode has a single notch portion disposed inwardly of a portion facing the third surface, and the second internal electrode has a single notch portion disposed inwardly of a portion facing the fourth surface,
    wherein each of the notch portions and a margin portion of the ceramic body in the second direction and the third direction are provided with a step absorption layer, respectively,
    wherein each of the first and second internal electrodes is completely spaced apart from the fifth and sixth surfaces,
    wherein the notch portion of the first internal electrode or the notch portion of the second internal electrode has a width greater than a width of the margin portion, and wherein the notch portion of the first internal electrode and the notch portion of the second internal electrode have a rounded shape in a second direction-third direction plane.

2. The multi-layered ceramic electronic component of claim 1, wherein the ceramic body comprises an active portion including the first and second internal electrodes disposed to oppose each other with the dielectric layer interposed therebetween so as to form capacitance and a cover portion formed on an upper portion and a lower portion of the active portion, and the margin portion of the ceramic body in the second direction and in the third direction is a margin portion of the active portion.

3. The multi-layered ceramic electronic component of claim 2, wherein the margin portion of the ceramic body in the second direction is a margin portion of the ceramic body in a longitudinal direction, and the margin portion of the ceramic body in the third direction is a margin portion of the ceramic body in a width direction.

4. The multi-layered ceramic electronic component of claim 1, wherein a width of the notch portion in the third direction is 20% to 80% compared to a width of each of the first internal electrode and the second internal electrode in the third direction.

5. The multi-layered ceramic electronic component of claim 1, wherein a thickness (te) of one of the first and second internal electrodes is less than 1 µm.

6. The multi-layered ceramic electronic component of claim 1, wherein a thickness (td) of the dielectric layer is less than 2.8 µm.

7. The multi-layered ceramic electronic component of claim 1, wherein a thickness (td) of the dielectric layer and a thickness (te) of one of the first and second internal electrodes satisfy td>2×te.

8. The multi-layered ceramic electronic component of claim 1, wherein the step absorption layer is made of a ceramic material.

9. The multi-layered ceramic electronic component of claim 1, wherein one of the first and second electrode layers includes 5% by volume or more of glass compared to a conductive metal contained in the one of the first and second electrode layers.

10. A multi-layered ceramic electronic component, comprising:

a ceramic body including a dielectric layer and first and second internal electrodes stacked in a first direction with the dielectric layer interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and first and second external electrodes disposed outside of the ceramic body and including first and second electrode layers, respectively, the first and second electrode layers connected to the first and second internal electrodes, respectively, wherein the first internal electrode is exposed from the third surface of the ceramic body and the second internal electrode is exposed from the fourth surface, wherein the first internal electrode has a single notch portion disposed inwardly of a portion facing the third surface, and the second internal electrode has a single notch portion disposed inwardly of a portion facing the fourth surface, wherein each of the notch portions and a margin portion of the ceramic body in the second direction and the third direction are provided with a step absorption layer, respectively, wherein the notch portion of the first internal electrode or the notch portion of the second internal electrode has a width greater than a width of the margin portion, and wherein the notch portion of the first internal electrode and the notch portion of the second internal electrode have a round shape in a second direction-third direction plane.

11. The multi-layered ceramic electronic component of claim 10, wherein the ceramic body comprises an active portion including the first and second internal electrodes disposed to oppose each other with the dielectric layer interposed therebetween so as to form capacitance and a cover portion formed on an upper portion and a lower portion of the active portion, and the margin portion of the ceramic body in the second direction and in the third direction is a margin portion of the active portion.

12. The multi-layered ceramic electronic component of claim 11, wherein the margin portion of the ceramic body in the second direction is a margin portion of the ceramic body in a longitudinal direction, and the margin portion of the ceramic body in the third direction is a margin portion of the ceramic body in a width direction.

13. The multi-layered ceramic electronic component of claim 10, wherein a width of the notch portion in the third direction is 20% to 80% compared to a width of each of the first internal electrode and the second internal electrode in the third direction.

14. The multi-layered ceramic electronic component of claim 10, wherein a thickness (te) of one of the first and second internal electrodes is less than 1 µm.

15. The multi-layered ceramic electronic component of claim 10, wherein a thickness (td) of the dielectric layer is less than 2.8 µm.

16. The multi-layered ceramic electronic component of claim 10, wherein a thickness (td) of the dielectric layer and a thickness (te) of one of the first and second internal electrodes satisfy td>2×te.

17. The multi-layered ceramic electronic component of claim 10, wherein the step absorption layer is made of a ceramic material.

18. The multi-layered ceramic electronic component of claim 10, wherein one of the first and second electrode layers includes 5% by volume or more of glass compared to a conductive metal contained in the one of the first and second electrode layers.

* * * * *